United States Patent [19]

Haruki et al.

[11] 3,728,845

[45] Apr. 24, 1973

[54] METHOD AND APPARATUS FOR STRIPPING THE COMPONENTS OF A MIXED SAMPLE FROM A TRAP

[75] Inventors: Tatsuro Haruki; Muneaki Itaya, both of Kyoto, Japan

[73] Assignee: Shimadzu Seisakusho Ltd., Kyoto, Japan

[22] Filed: Sept. 14, 1970

[21] Appl. No.: 71,908

[30] Foreign Application Priority Data

May 30, 1970 Japan..................................45/46648

[52] U.S. Cl..........................................55/67, 55/197
[51] Int. Cl. ................................................B01d 15/08
[58] Field of Search..........................55/67, 197, 386; 73/23.1; 210/31, 198

[56] References Cited

UNITED STATES PATENTS

| 3,146,616 | 9/1964 | Loyd | 55/386 X |
| 3,225,521 | 12/1965 | Burow | 55/197 X |
| 3,306,347 | 2/1967 | Favre | 55/386 X |

Primary Examiner—John Adee
Attorney—Fidelman, Wolffe & Leitner

[57] ABSTRACT

Method and apparatus for taking out the components of a mixed sample from a trap having a stationary phase therein where the sample components have been separately fixed at different positions. The whole effective length of the trap is simultaneously heated, and a "stripping" fluid is passed through the trap kept at the temperature so that the sample components are separately and successively elute.

7 Claims, 7 Drawing Figures

Patented April 24, 1973  3,728,845

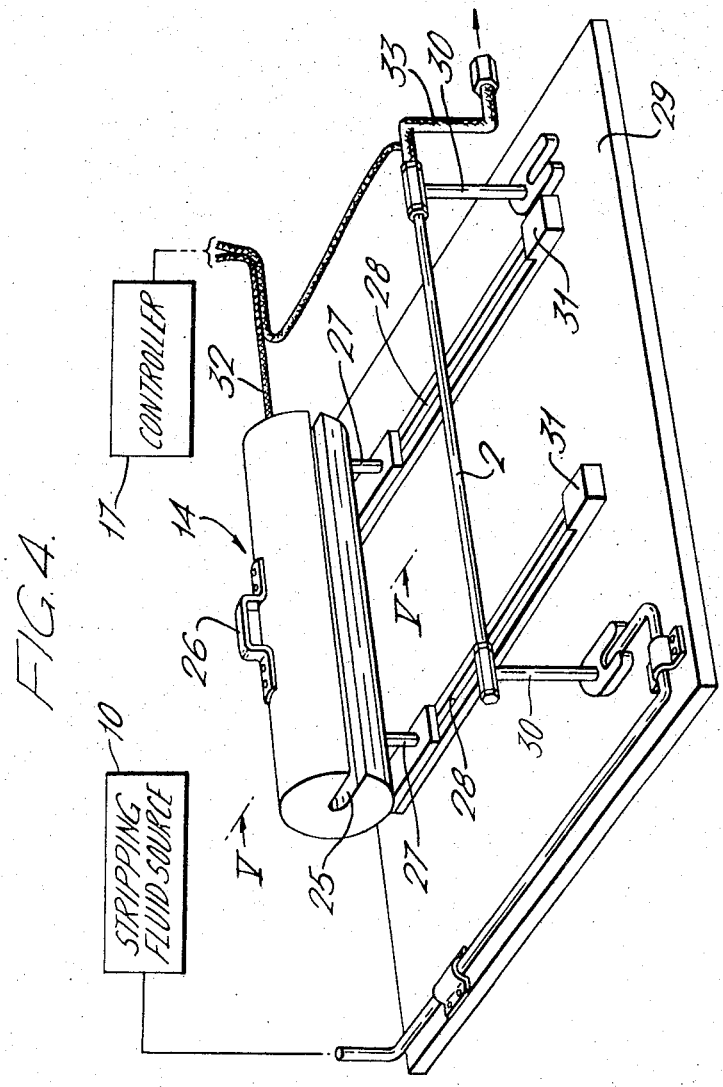

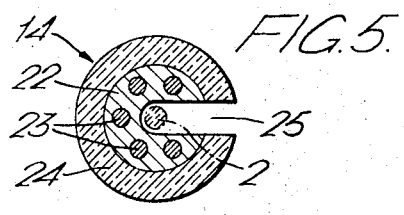
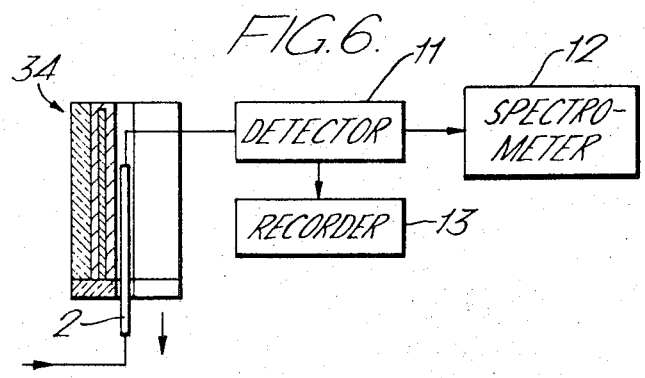
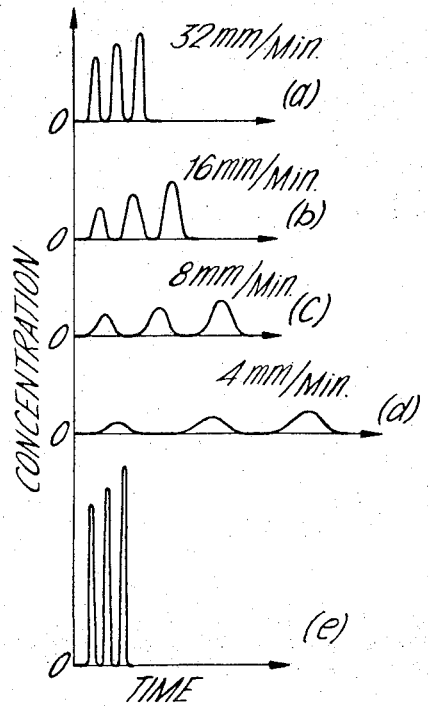

METHOD AND APPARATUS FOR STRIPPING THE COMPONENTS OF A MIXED SAMPLE FROM A TRAP

This invention relates to a method and apparatus for separately and successively taking out or "stripping" the components of a mixed sample from a trap where they have been fixed or held at separate positions, without disturbing their separated condition, so that the stripped components may be introduced into a spectrometer or the like for further desired analysis.

If a sample including a plurality of different components is analyzed by means of a spectrometer such as a mass spectormeter, the shape of the spectrum obtained becomes complicated so that accurate analysis of the sample is very difficult. Therefore, it is advisable to previously separate the sample into its components, which are then introduced into a spectrometer or the like device for further analysis. Chromatography is a technique suitable for separating such mixed samples into their components. As is well known, the separated components of a sample are successively carried out of the outlet of a chromatographic column by a carrier fluid. It would not be advisable, however, to directly introduce the sample components into a spectrometer as they flow out of the column. The reason is that the sample components as separated by a chromatograph are so much diluted with a carrier fluid that ordinary spectrometers cannot respond to such low concentration samples. Moreover, the chromatographic technique requires a considerably long time to obtain a result of analysis, whereas spectrometry requires a shorter time. Therefore, if a chromatograph is directly connected to a spectrometer, a great unbalance will occur between the speed of analysis of the two devices, so that the spectrometer must wait a long time before its receives samples from the chromatograph. This certainly is very uneconomical.

To solve the problem involved in combining a chromatograph and a spectrometer, it has been proposed in U.S. patent application Ser. No. 685,907, now U.S. Pat. No. 3,581,465. to fix the components of a sample as separated by the chromatographic technique in a trap in a concentrated condition and then "strip" the fixed sample components out of the trap one after another for introduction into a spectrometer or the like device for further analysis. The trap may comprise a column similar to that used in a chromatograph and containing a suitable stationary phase such as used in the chromatographic column. The trap is connected to the outlet of the column of a chromatograph and given a temperature gradient lengthwise thereof, so that as the sample components flow out of the chromatographic column they separately enter the trap and are fixed at different positions therein when the trap is removed from the column. In order to take out or "strip" the fixed sample components from the trap, it has been proposed to heat the trap progressively from one end thereof to the other while flowing a carrier or "stripping" fluid therethrough. According to this prior art method, the slower is the speed at which the heater is moved lengthwise of the trap, the better is the separation or resolution of the sample components stripped out of the trap, but the lower becomes their concentrations. On the contrary, the higher the moving speed of the heater, the higher the concentrations of the stripped sample components, but the worse their separation or resolution.

Accordingly, it is one object of the invention to provide a method and apparatus for separately and successively taking out or stripping the components of a mixed sample from a trap where they have been fixed or held at separate positions, without disturbing their resolution.

Another object of the invention is to provide a method and apparatus for separately and successively stripping the components of a mixed sample in concentrated condition from a trap where they have been fixed or held at separate positions.

In one embodiment of the invention, the components of a sample to be analyzed are fixed by chromatography at separate positions in a trap similar to the column used in a chromatograph. On the other hand, a heating oven is heated to a required temperature. Then, the whole effective length of the trap having the sample components fixed therein is put in or enclosed by the heating oven so as to be heated substantially simultaneously so that the sample components come into the gaseous phase without band broadening. Then, a carrier or "stripping" fluid is passed through the trap so as to separately remove or "strip" therefrom the sample components one by one. The essentials of the method of this invention are that uniformity in temperature should exist in the cross-sectional area of the heated trap perpendicular to the axis thereof; and that the whole effective length of the trap having the separate sample components fixed therein should be heated substantially simultaneously.

The invention, with its above and other objects, features and advantages, will be clearly understood by the following description with reference to the accompanying drawings, wherein the same reference numerals in different figures denote corresponding parts, and wherein:

FIG. 1 schematically shows a method of fixing the separate components of a sample in a trap;

FIG. 2 schematically shows how a fixed sample component in the trap is moved therein by a prior art method;

FIG. 4 is a perspective view of a preferred form of the stripping oven used in the apparatus of the invention;

FIG. 5 is a sectional view taken along line V — V of FIG. 4;

FIG. 6 is a schematic drawing of a prior art apparatus wherein a stripping oven is moved along the length of the trap to remove therefrom the trapped sample components; and FIG. 7 shows different chromatograms obtained by the apparatuses of FIGS. 3 and 6.

Figure 1:
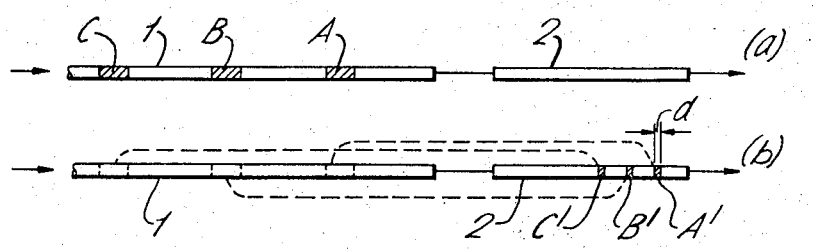

Referring first to FIG. 1, there are shown a column 1 of any conventional chromatograph, not shown, and a trap 2 connected to the outlet of the column. The trap 2 may be similar in construction to the column 1 and contain a suitable stationary phase, which may be a solid phase such as alumina, charcoal and silica gel, or a liquid phase such as silicone oil coated on or impregnated into the supporting medium. With a suitable temperature gradient given to the trap 2 lengthwise thereof, the separated components of a sample to be analyzed flow out of the column carried on a carrier fluid and enter the trap. Suppose that three sample components flow down in the column as shown at A, B and C in FIG. 1a. These components are transferred into the trap 2 and flow therein as at A', B' and C' in FIG. 1b. When all the separated sample components have been transferred into the trap 2, it is disconnected from the chromatographic column 1, and in the trap there are fixed the separated components A, B and C at A', B' and C', respectively. For futher details of the above method of fixing or trapping the separated components of a sample in the trap and an apparatus therefor, reference should be had to the previously mentioned U.S. application.

This invention concerns with removing or stripping the sample components from the trap where they have been fixed in such a manner as mentioned above. The trapped components must be stripped from the trap in a highly concentrated condition and with a good resolution between the separated components. To accomplish this, in accordance with the invention, the whole effective length of the trap is simultaneously heated to a required temperature, and when the temperature has been reached in each and every portion of the trap, a carrier or "stripping" fluid is passed through the trap to separately and successively strip the fixed sample components from the trap.

Figure 2:
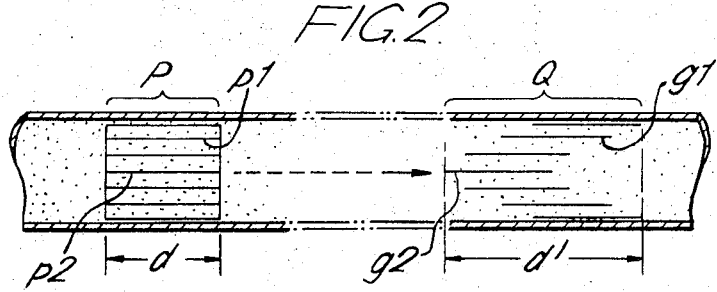

In heating the trap, it is essential that the temperature should be substantially uniform all over the cross-sectional area of the trap perpendicular to the axis thereof. Suppose that the temperature of the trap is not uniform over the cross-sectional area perpendicular to the aixs of the trap. The moving speed of the same fixed sample component varies in different portions of the cross-sectional area. This is schematically shown in FIG. 2. Initially the sample component fixed within a area P having a length or band width $d$ moves through the trap and after a certain period of time comes to occupy an area Q having a width $d'$ which is greater than the previous width $d$. This is because the sample component at a position $p_1$ moves through the trap as far as a position $q_1$, while during the same period of time the sample component at another position $p_2$ the temperature of which is lower than that of the position $p_1$ moves a less distance at a lower speed so as to occupy a position $q_2$ so that the width $d$ of the area P has been broadened to $d'$ as the sample component moves in the trap. In other words, the concentration of the sample component has become lower in the area Q than in the area P.

In accordance with the invention, however, since the temperature of the trap is kept substantially uniform over the cross-sectional area transverse of the trap, the sample components fixed therein move therealong without much broadening of the areas they occupy, so that they can be taken out from the trap in a highly concentrated condition and with a good resolution.

Figure 3:
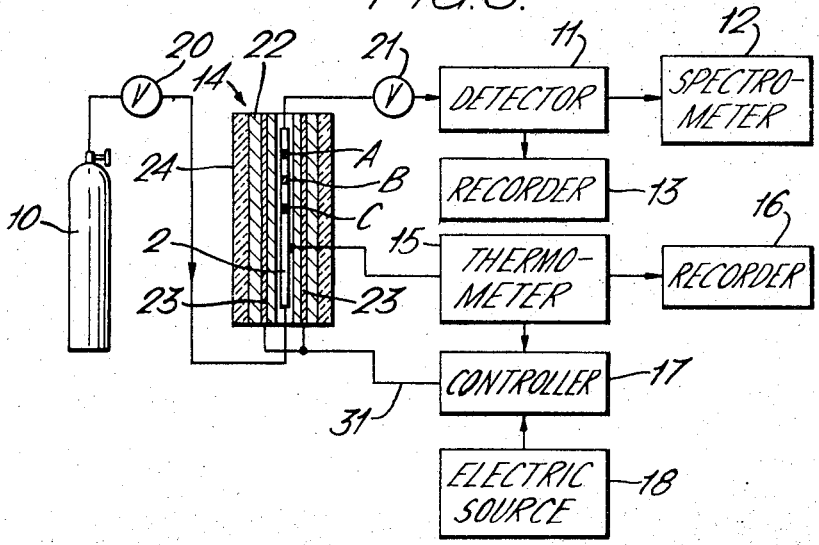
FIG. 3 is a general layout of the apparatus of the invention.

Turning now to FIG. 3, there is shown a trap 2 in which a plurality, say, three components A, B and C of a sample to be analyzed are separated and fixed in the manner previously mentioned with reference to FIG. 1. The trap has its one end connected to a source 10 of a stripping fluid such as helium gas and its opposite end connected through a detector 11 to an analyzer 12 such as a spectrometer. The output of the detector 11 is also applied to a recorder 13. The record obtained is nothing but a chromatogram of the sample analyzed.

The chromatogram not only provides data for analyzing the sample but also can be used as a monitor for introducing the sample components into the spectrometer 12. An electric oven 14 heats the trap 2, with a thermometer 15 for measuring the temperature in the oven, a recorder 16 for recording the oven temperature, and a controller 17 for controlling electric energy to be supplied from a source 18 to the oven 14 so as to regulate its temperature. A cock 20 is inserted in the connecting pipe between the source 10 of the stripping gas and the trap 2 and also another cock 21, between the trap 2 and the detector 11. By handling these cocks it is possible to control the flow of the stripping gas through the trap or close the opposite ends of the trap thereby preventing the flow of the stripping gas enclosed therein.

A preferred form of the oven 14 is shown in FIGS. 4 and 5. The oven may comprise an aluminium block 22 of cylindrical shape having a plurality of cartridge heaters 23 embedded therein and a cylindrical cover 24 of a thermal insulator. The oven has a radial slot or groove 25 extending the whole length of the cover 24 and reaching deep into the axis of the aluminium block 22. The oven is provided with a handle 26 and supporting legs 27 the lower ends of which are slidably engaged in a pair of parallel guide grooves 28 formed in the upper surface of a base 29. The base has a pair of spaced arms 30 for supporting the trap 2 at right angle to the parallel guide grooves 28 and at such a height above the base that by the help of the handle 26 the oven can be brought from the position shown in FIG. 4 laterally toward the trap so as to completely enclose the whole length of the trap at the same time deep in the radial groove 25 in the aluminium heating block 22 as shown in FIG. 5 for stripping of the sample components from the trap, and from this position back to the retired position in FIG. 4 after the stripping operation has been completed. A pair of stoppers 31 hold the oven in the operating position. A wire 32 connects the heaters 23 of the oven 14 to the electric source 18 through the controller 17. A heater 33 encircles a pipe connecting the outlet of the trap to the spectrometer so that the pipe is heated to keep the sample components stripped out of the trap in gaseous condition.

In operation, while the trap 2 is at room temperature, by opening the cock 20 the stripping gas is supplied from the source 10 into the trap to fill the same, and then by closing the cock 20 the gas is enclosed in the trap so as not to move therein. On the other hand, the oven 14 at the retired position in FIG. 4 is preheated to a required temperature. When the temperature has been reached, the oven is brought to the heating position enclosing the trap therein. Upon lapse of a time enough for the temperature of the trap to have become stable at the required value, both cocks 20 and 21 are opened to flow the gas through the trap, so that the sample components fixed therein are successively stripped out of the trap.

As previously mentioned, it is essential that while the stripping gas is flowing through the trap, the trap should be kept at a substantially uniform temperature all over the cross-sectional area perpendicular to the axis thereof. To provide such a uniform temperature distribution over the cross-sectional area of the trap, it is preferable to observe on the recorder 17 the temperature change in the oven and begin to flow the stripping gas some time after the temperature of the oven has become stable at the required value.

FIG. 6 schematically shows a prior art method of stripping the sample components from a trap where they have been fixed in the previously mentioned manner. This method employs a heating oven 34, which is so designed as to be movable along the trap 2 from its downstream to upstream ends, so that the heated zone is moved along the trap. This method as described in the previously mentioned U.S., patent application is intended chiefly for stripping the separated and fixed components of a sample from a trap with as high a resolution as possible. By this method, however, since the sample components fixed in the trap begin to be moved before a required uniform temperature has been reached over the sectional area perpendicular to the axis of the trap, and each area in which a separated component is fixed is heated from its portion near the outlet of the trap first, the area is broadened, with a resulting decrease in the concentration of the sample component stripped out of the trap. In accordance with the invention, however, since the whole effective length of the trap is heated simultaneously, no such defect of the prior art method is encountered.

FIG. 7 shows chromatograms a, b, c and d obtained by the prior art method of FIG. 6 in comparison with a chromatogram e obtained by the method of the present invention. The trap used is 500 mm long and has an inner diameter of 3 mm. The stationary phase filled in the trap is 15 percent SE - 30 on Chromosorb W 60 to 80 mesh. The temperature of the ovens 14 and 34 is kept at 250°C. The stripping gas used is helium flowing at the rate of 50 ml per minuite. Graphs a, b, c and d are obtained by the oven 34 moving at speeds of 32, 16, 8 and 4 mm per minuite, respectively. As shown, the slower is the speed of the moving oven, the higher is the resolution, that is, the better is the separation of the sample components, but the wider is the peak width of each separated sample component. This means that the concentration of the sample components stripped out of the trap becomes lower as the moving speed of the oven 34 decreases. As previously mentioned, low concentration samples are not suitable for introduction into a spectrometer or the like device. The chromatogram e obtained by the method of the present invention, however, shows far narrower and higher peaks, that is to say, the separated components stripped out of the trap have higher concentrations than any of the previously mentioned chromatograms, and yet a good resolution between the different sample components is also achieved.

A preferred embodiment of the invention having been illustrated and described, there are many modifications thereof within the scope of the invention. For example, although in the illustrated embodiment a separate trap is connected to the outlet of the column of a chromatograph to receive and fix the sample components from the column, the column of the chromatograph itself may be used as a trap, or a mixed sample may be directly introduced into the inlet of the trap. Therefore, in this specification and claims the term "trap" is used in such a broad sense as to include the chromatographic colum. Instead of flowing a stripping fluid through the tap, a suction may be applied to the trap through its one end to withdraw the trapped sample components therefrom. In short, in order to strip the sample components out of the trap a suitable pressure difference is to be generated between the opposite ends of the trap. To this end any suitable methods or devices may be employed.

What we claim is:

1. A method of stripping the components of a mixed sample received from a chromatographic column from a trap having a stationary phase therein where the sample components have been separately fixed at different positions, comprising the steps of heating the whole effective length of said trap substantially simultaneously; preventing any fluid from being introduced into said trap until all of said components come into a gaseous phase; and providing a pressure difference between the opposite ends of said trap whereby said components are separately and successively stripped out of said trap.

2. The method of claim 1, wherein said pressure difference providing step comprises flowing a stripping fluid through said trap.

3. The method of claim 1, wherein said trap is heated so that the whole cross-sectional area of said trap perpendicular to the axis thereof is maintained at a substantially uniform temperature while providing a pressure difference between the opposite ends of said trap.

4. An apparatus for stripping the components of a mixed sample from a trap cnnected to chromatographic column, said trap having a stationary phase therein where the sample components have been separately fixed at different positions, comprising means for supporting said trap, means for heating the whole effective length of said trap substantially simultaneously; and means for sealing said trap while all of said components come into a gaseous phase and providing a pressure difference between the opposite ends of said trap after reaching said gaseous phase whereby said sample components are separately and successively stripped out of said trap.

5. The apparatus of claim 4, wherein said heating means comprises: a cylindrical heating block covered by a thermal insulator and having a radial groove extending the whole length thereof, and means for supporting said block in parallel with and for movement relative to said trap so that by movement of one of said block and trap relative to the other, said block can be brought to a position where the whole effective length of said trap is enclosed in said radial groove of said block so as to be substantially simultaneously heated thereby.

6. The apparatus of claim 4, wherein said trap is the column of a chromatograph.

7. The apparatus of claim 4, wherein said pressure difference providing means comprises a source of a stripping fluid, means for connecting one end of said trap to said fluid source so that said fluid flows through said trap, and means for controlling flowing of said fluid.

* * * * *